Feb. 17, 1942. G. RAYMOND ET AL 2,273,736
METHOD OF MAKING PRESSURE VESSELS AND THE LIKE
Filed Dec. 5, 1938 3 Sheets-Sheet 1
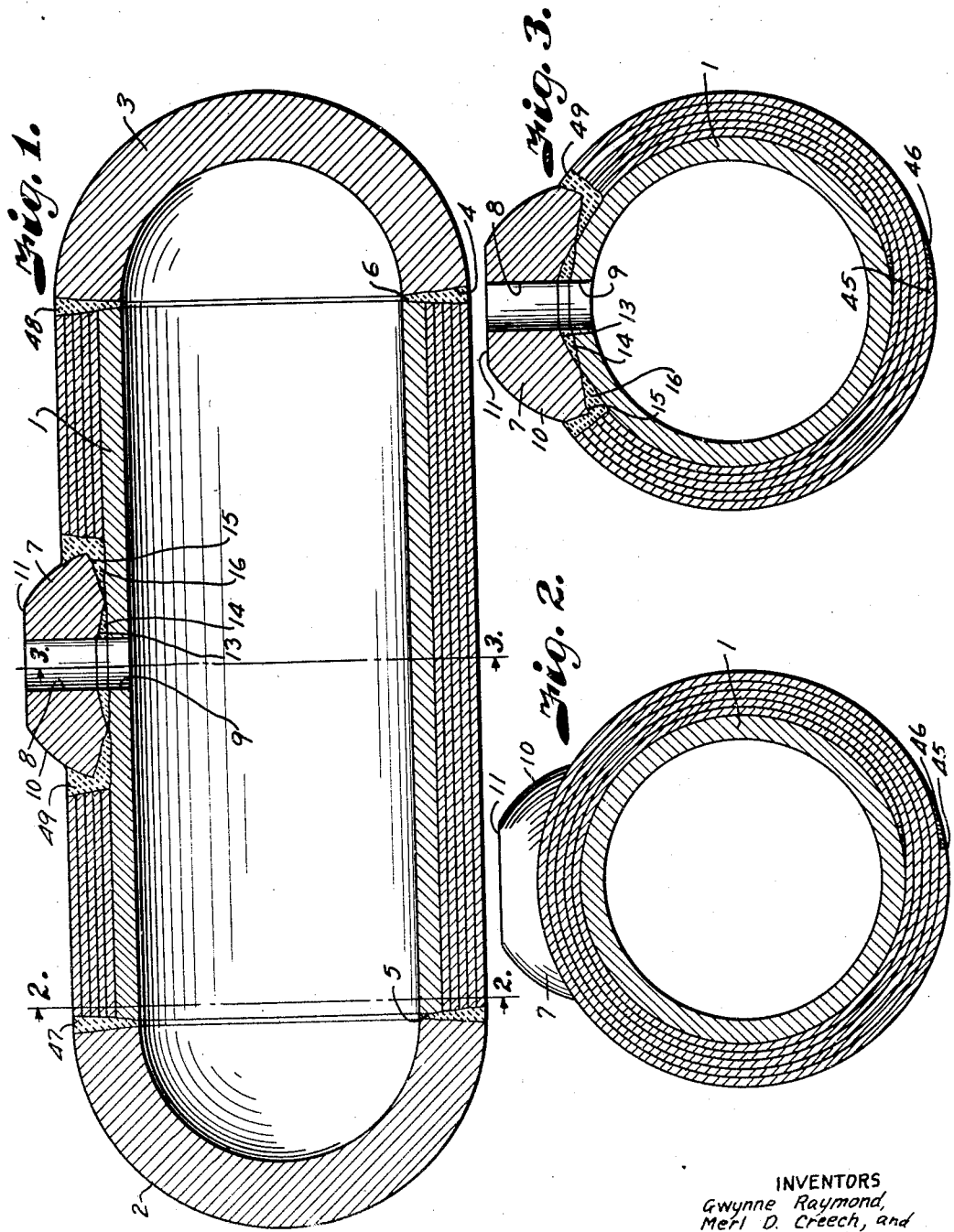
INVENTORS
Gwynne Raymond,
Merl D. Creech, and
Ralph L. Feagles.
BY
ATTORNEY Feb. 17, 1942.  G. RAYMOND ET AL  2,273,736
METHOD OF MAKING PRESSURE VESSELS AND THE LIKE
Filed Dec. 5, 1938  3 Sheets-Sheet 2
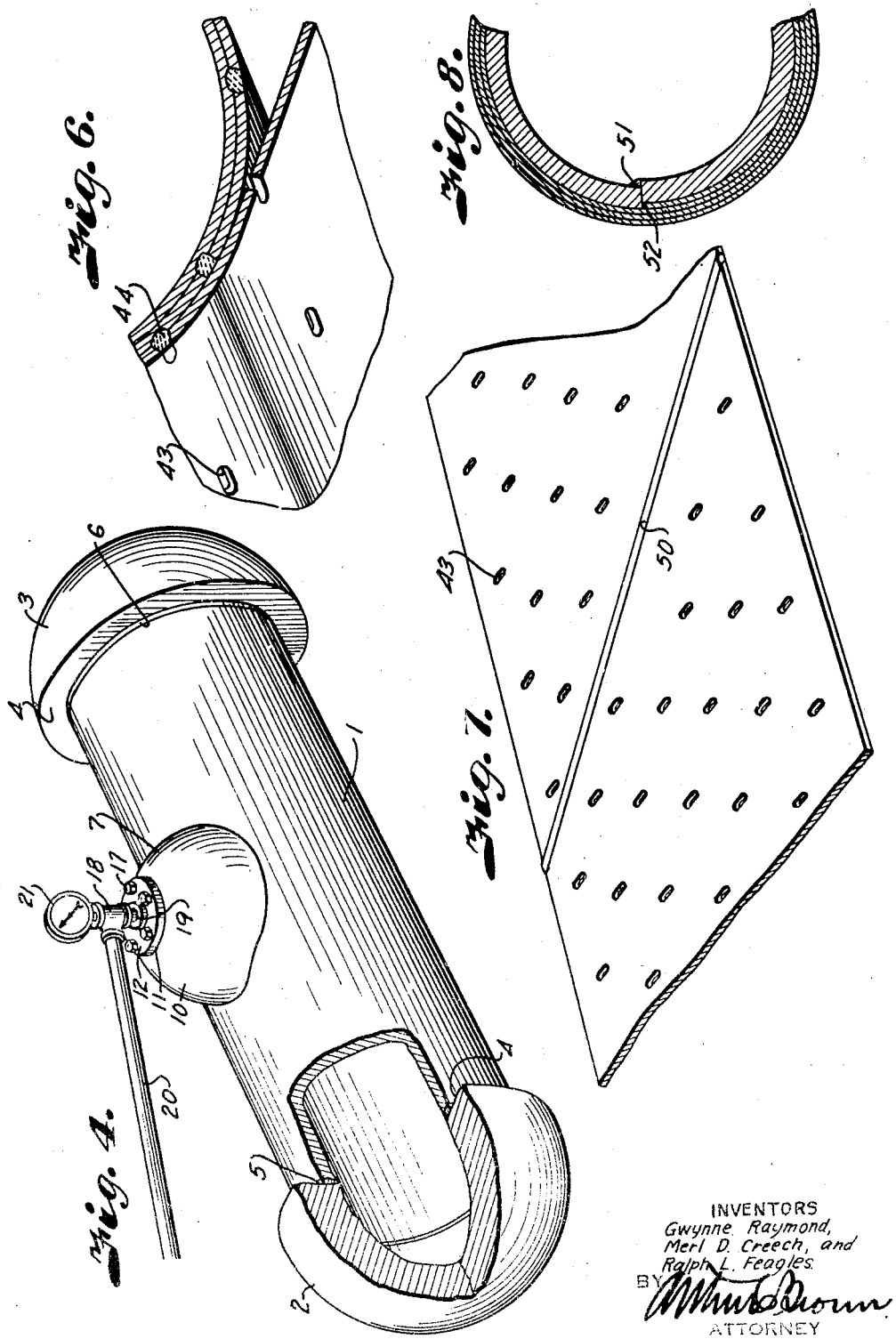
INVENTORS
Gwynne Raymond,
Merl D. Creech, and
Ralph L. Feagles
BY
ATTORNEY

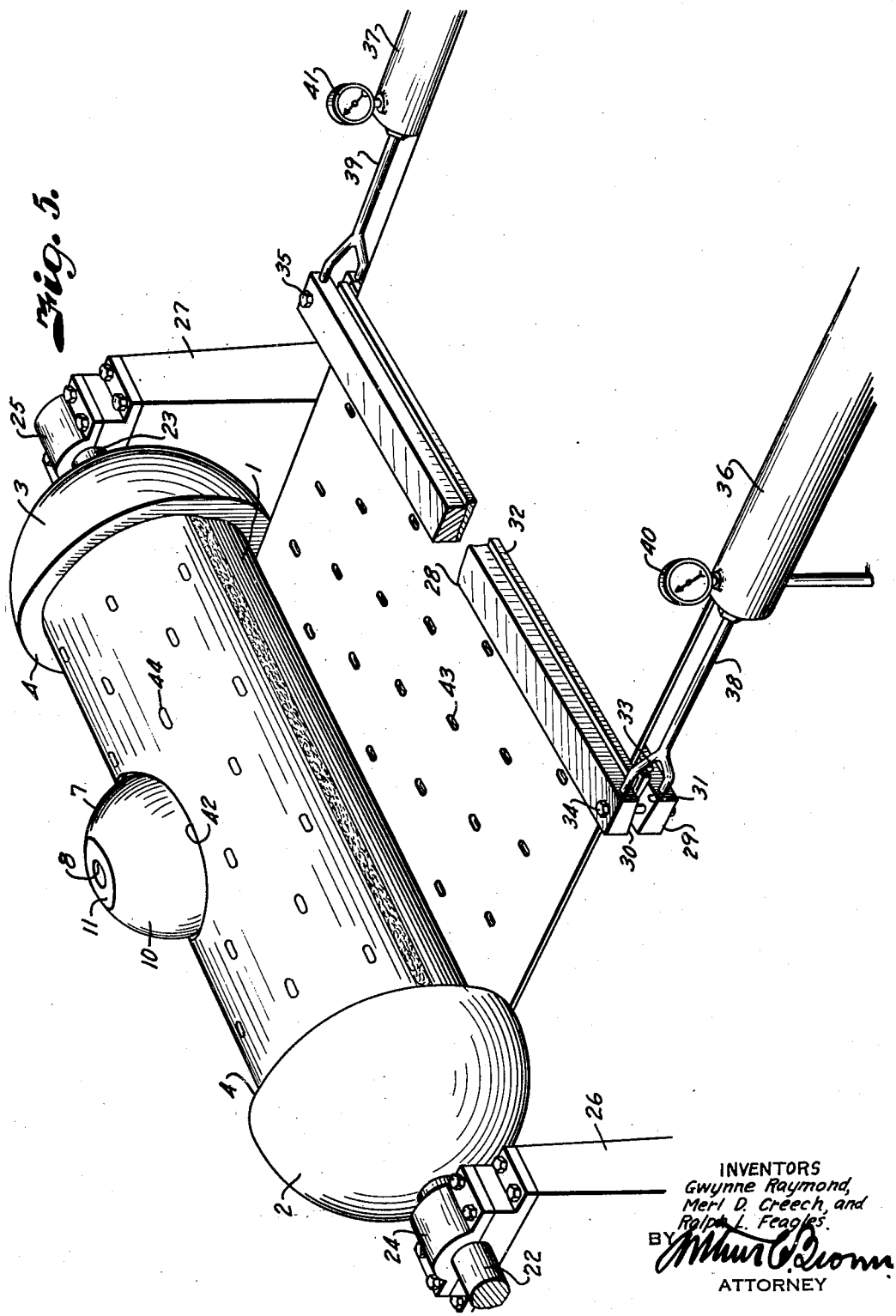

Patented Feb. 17, 1942

2,273,736

UNITED STATES PATENT OFFICE 2,273,736

METHOD OF MAKING PRESSURE VESSELS AND THE LIKE

Gwynne Raymond, Merl D. Creech, and Ralph L. Feagles, Oklahoma City, Okla.

Application December 5, 1938, Serial No. 244,076

2 Claims. (Cl. 29—148.2)

This invention relates to a method of manufacturing pressure vessels and the like, particularly vessel capable of withstanding extremely high working pressures and temperatures.

Industry of today requires vessels which are adapted to safely contain high pressures and temperatures. In fact, many high pressure processes require the use of vessels in such size that the walls must be as much as six to eight inches in thickness. The manufacture of such vessels is difficult and an extremely expensive procedure. Where plates of this thickness are used, forging and heat treatment must be resorted to as it is impractical to roll metal sheets of the required thickness. The metal also becomes so greatly distorted or deformed in the manufacturing procedure that the internal stresses seriously weaken the vessel and it is difficult to calculate the safe working pressures that they may withstand. To solve these problems attempts have been made to form vessels by winding layer upon layer of sheet metal to build up walls of the desired thickness, and then to form the layers in as nearly a homogeneous mass as possible by heating and forging, but the result is inaccurate and unsafe vessels result.

It is, therefore, the principal purpose of the present invention to provide a method of forming laminated vessels wherein the internal stresses of the wall structure may be so controlled that a vessel may be relied upon to safely contain the working pressures for which it was designed.

Other objects of the invention are to provide a method of forming a laminated vessel having a high strength weight ratio for safely containing a given pressure; to provide a method of vessel construction by which the vessel may be accurately tested for leaks; and to provide a method of forming laminated vessels wherein the laminations are securely anchored to the heads of the vessel and each layer takes its part of the working stresses when the vessel is placed in operation.

In accomplishing these and other objects of the invention, as hereinafter pointed out, we have provided an improved method of procedure, as illustrated in the accompanying drawings, wherein:

Fig. 1 is a longitudinal section through a vessel constructed in accordance with the present method.

Fig. 2 is a cross-section through the vessel on the line 2—2 of Fig. 1.

Fig. 3 is a similar section on the line 3—3 of Fig. 1 to better illustrate the attachment of a fitting in the wall thereof.

Fig. 4 is a perspective view of the inner shell or foundation of a vessel, having the heads welded thereto and showing the method of testing for leaks, particularly the welds securing the heads to the shell.

Fig. 5 is a detail perspective view illustrating the method of winding a continuous metal ribbon on the tested shell, whereby any predetermined degree of tension may be produced in the respective layers according to the working pressures with which the tank is to be subjected.

Fig. 6 is a fragmentary section of the wall of the tank in the course of construction, particularly illustrating the method of welding the laminations.

Fig. 7 is a detail perspective view of a joint used in forming a ribbon of sufficient length to provide the required number of wrappings.

Fig. 8 is a detail fragmentary section of a modified form of vessel.

Referring more in detail to the drawings:

In carrying out our invention, we have discovered that when pressure is applied within the interior of a thick walled vessel tending to enlarge the inner diameter thereof, the outer diameter is not increased perceptibly. This is accounted for in the fact that the inner portion of the wall has compressed and the outer portion of the wall is placed in tension, with the result that the internal stresses seriously weaken the vessel and it is not capable of safely retaining the working pressures for which the wall thickness was designed. We have also discovered that this same action takes place in a laminated wall with the result that the stresses imparted in the various layers do not adequately perform their part in withstanding high internal pressures. We have, therefore, found it essential to make use of stresses in ribbon layers by varying the tension imparted thereto during wrapping, so that the tension is controlled and varied according to the stresses which the respective layers must withstand, to form a vessel of maximum strength for a given number of laminations and wall thickness.

When the cylindrical wall of a vessel is formed merely by winding one convolution on another and the heads welded thereto, it is difficult to prevent leaks, and when a leak does occur the pressure creeps out between the laminations so that its origin cannot be determined from the outside of the vessel. To overcome this difficulty we have adopted the principle of the automobile tire wherein an inner tube prevents leaks and the outer casing gives the required strength. We therefore make up an inner shell 1 by rolling a sheet of material of a desired thickness to withstand testing pressures, taking in consideration the inner diameter of the tank, the material being sufficiently thin to permit ready fabrication thereof in cylindrical form, and weld to the ends thereof heads 2 and 3 which are preferably formed of solid metal and of desired thickness to withstand the internal working pressures of the completed vessel.

In the illustrated instance the heads 2 and 3 are substantially hemispherical in form and have their inner radius corresponding to the inner radius of the shell, the outer radius corresponding to the outer diameter of the finished tank, as shown in Fig. 1. The abutting faces 4 therefore project circumferentially of the outer surface of the shell and are tapered from the plane of the centers of curvature to facilitate welding, as later described. The heads 2 and 3 are placed concentrically with the axis of the shell 1 and are welded, as indicated at 5 and 6.

If the shell of the tank is to be provided with a fitting 7, the fitting should be of proper thickness to withstand the internal pressures of the finished vessel. In the illustrated instance the fitting 7 is in the form of a ring, having a central opening 8 registering with a corresponding opening 9 in the shell. The outer periphery of the fitting is rounded on suitable curves, as at 10, and the terminal thereof flattened, as at 11, to temporarily secure a closure plate 12. The face of the fitting secured to the shell is countersunk, as at 13, to receive welding 14, by which the fitting is attached to the shell. The portion of the fitting encircling the weld is preferably tapered, as at 15, to form an annular space to receive a welding material 16, supplementing the inner weld 14. The plate 12 is secured over the opening 8 by bolts 17 extending therethrough and secured in threaded sockets in the flattened face of the fitting. The plate 12 carries a T-fitting 18, one terminal of which is connected by a nipple 19 with a central opening in the plate, and the other connections are respectively provided with a liquid supply line 20 and a pressure gauge 21 whereby liquid is admitted into the tank under pressure, as indicated by the gauge 21, to test the shell or foundation against leaks prior to completion of the vessel, as now described.

After testing, the plate 12 is removed, and suitable trunnions 22 and 23 are temporarily welded or otherwise attached to the heads 2 and 3 in the axis thereof, as shown in Fig. 5, whereby the shell is rotatably supported in bearings 24 and 25 secured to suitable supports 26 and 27. One of the trunnions, for example 22, is of sufficient length to be connected with any suitable power for effecting rotation of the shell. A metal ribbon is then prepared, having a width corresponding to the spacing between the heads of the tank, and of sufficient length to provide the necessary number of convolutions to produce a tank of a predetermined wall thickness. One end of the ribbon is then skived and welded to the shell of the tank by a transverse weld, as shown in Fig. 5. The ribbon is then placed in a gripping device, such as clamping bars 28 and 29 having angle shaped inner faces 30 and 31 cooperating with wedge plates 32 and 33 directly engaging the upper and lower surfaces of the ribbon. The wedge plates are drawn into clamping engagement with the ribbon by drawbolts 34 and 35, inserted through the ends of the clamping bars 28 and 29. The thicker portion of the wedges are arranged so that when pulling pressure is applied to the bars in a direction away from the welded end of the ribbon, this pressure acts to enhance gripping action of the wedges so as to prevent slippage between the bars and ribbon. The ends of the bars are suitably connected with hydraulic cylinders 36 and 37, through rods 38 and 39, whereby variable tensions may be applied in the ribbon through control of the fluid pressure medium used in the respective cylinders, the pressures being indicated by gauges 40 and 41 connected with the respective cylinders.

While tension is being maintained on the ribbon, the foundation is being rotated to wrap the ribbon about the shell 1. On each revolution it is necessary to cut an opening 42 in the ribbon so that the fitting will pass therethrough, permitting the convolutions to closely engage each other whereby frictional contact of one convolution on the other prevents unwinding thereof and therefore maintains the imparted tension. If desired the ribbon may be provided with welding apertures 43, whereby one convolution is welded to the other, as indicated at 44. A sufficient number of convolutions is wound on the shell so that the peripheral face of the final convolution registers with the peripheral edges of the heads. During readjustment of the bars 28 and 29, when the hydraulic mechanisms have come to the end of their stroke, tension may be maintained on the ribbon by a similar mechanism, adjustable weights, or the like. When the winding is complete, the free edge of the ribbon may be skived, as indicated at 45, and welded to the underlying convolution by welding 46.

In order to provide a welding space between the ends of the convolutions and the heads, the side edges of the ribbon are so shaped that when wound on the shell they will lie on an angle corresponding to the angle of the head faces to form a welding space in which a welding material is deposited, as indicated at 47 and 48. Welding material is also filled in around the fitting, as indicated at 49. The trunnions are then removed from their supporting bars and cut from the ends of the heads, completing the tank assembly.

In tanks requiring longer ribbons than the length of sheets obtainable, they may be formed of a series of sheets preferably having the ends cut on a bias, as shown at 50, Fig. 7, whereby the joint extends spirally relatively to the shell so that the gripping action of the upper and lower sheets supplements the strength of the weld.

In extremely long tanks, two or more ribbons may be wound on the shell and welded together in the same manner as above described.

In order to avoid skiving or feathering of the inner edge of the sheet, or that edge attached to the shell 1, the edges of the shell, when secured together, may be offset as indicated at 51 in Fig. 8. The edge 52 of the ribbon may then be abutted against the offset and welded as shown.

In order to give a better understanding of the variable or differential tension applied in the respective convolutions to produce a tank of maximum strength, the following is a calculation for a vessel having a ¾ inch shell rolled to 14 inches inside diameter, then wound with a ⅛ inch plate to bring the final outside diameter to 17½ inches giving a total wall thickness of 1¾ inches, a working pressure within the tank assumed to be 3,000 pounds per square inch:

The A. S. M. E. Code gives the following as the stress in the above vessel:

Stress=15.75×3000/2×1.75=13,500 lb./sq. in.

The stress in the above vessel using the more exact equation derived and applicable to shells relatively thick compared to the diameter ("Strength of Materials" Case, Longmans, Chap. XXVIII)

Where $r_1$=inner radius of vessel
$r_2$=outer radius of vessel
$r$ =radius at point where stress is to be found
$p$ =internal pressure
$s$ =stress caused by this pressure $$S=\frac{pr_1^2}{r_2^2-r_1^2}\frac{r_2^2+r^2}{r^2}$$

Substituting in the above formula we get stress at inner radius where $r=r_1$ $$S=\frac{3000\times 49}{76.5-49}\frac{76.5+49}{49}=13,680 \text{ lbs./in.}^2$$

Stress at outer radius where $r=r_2$ $$S=\frac{3000\times 49}{76.5-49}\frac{76.5+76.5}{76.5}=10,700 \text{ lbs./in.}^2$$

From the foregoing calculations it is seen that the stress is not distributed uniformly throughout the thickness of the shell but is greatest at the inner surface. The difference between the inner and outer fibre stress will become more and more as the thickness of the shell is increased with respect to the diameter.

By varying the tension in the laminations any desired stress distribution may be obtained. Thus, by suitably varying the tension in the laminations, unequal distribution of stresses is overcome.

Tensions and compressions in the different layers as they are wound on the vessel:

| 6/8 | 7/8 | 8/8 | 9/8 | 10/8 | 11/8 | 12/8 | 13/8 | 14/8 |
|---|---|---|---|---|---|---|---|---|
| −600 | 600 | | | | | | | |
| −1,115 | 515 | 600 | | | | | | |
| −1,491 | 453 | 538 | 500 | | | | | |
| −1,702 | 420 | 505 | 467 | 400 | | | | |
| −1,942 | 380 | 465 | 427 | 360 | 400 | | | |
| −2,163 | 344 | 421 | 391 | 324 | 364 | 400 | | |
| −2,304 | 311 | 388 | 358 | 291 | 331 | 367 | 400 | |
| −2,443 | 288 | 365 | 335 | 268 | 303 | 344 | 377 | 300 |

The headings in the above tables designate the thickness of the shell and the convolutions wound therearound. It will be noted that the convolutions are eight in number. The figures in column one designate compression forces on the inner shell which vary from −600 pounds with the first convolution to −2443 pounds after the eighth convolution has been applied. The first figures in the following columns designate tension in pounds per inch of width maintained in the ribbon as the convolutions are formed. The subsequent figures in these columns define the tension maintained in the convolutions with each wrap. For example, after the second convolution has been wound over the first maintaining a tension of 600 pounds per inch of width in the second convolution, the tension of the first convolution has been reduced from 600 to 515 pounds. After the third convolution has been formed, the tension in the first convolution has been reduced to 453 pounds and the tension in the second convolution 538 pounds. Thus the tensions of the convolutions, after the final one has been applied, are the figures at the bottoms of the columns. It will be noted that these figures are for practical purposes of similar relative magnitude, for example the tension in the first convolution is now 288 pounds and the tension in the outermost convolution 300 pounds. Attention is also directed to the fact that as each convolution is wound upon a succeeding convolution, the tensions of the succeeding convolutions are reduced in progressive order. Since the vessel is in equilibrium, the algebraic sum of all the tensions and compressions in any horizontal line of the above table will be zero.

The stresses due to the above tensions and to the internal pressure will be as follows:

| Radius | Initial stress | Stress due to pressure | Total stress |
|---|---|---|---|
| 7.000 | −3,257 | 13,700 | 10,400 |
| 7.750 | | | |
| 7.875 | 2,300 | 12,100 | 14,400 |
| 8.000 | 2,920 | 11,700 | 14,600 |
| 8.125 | 2,680 | 11,500 | 14,200 |
| 8.250 | 2,150 | 11,400 | 13,600 |
| 8.375 | 2,464 | 11,200 | 13,600 |
| 8.500 | 2,750 | 11,000 | 13,700 |
| 8.625 | 3,200 | 10,700 | 13,900 |
| 8.750 | 2,400 | 10,600 | 13,000 |

The above table designates stresses. The first column designates the radius of the respective convolutions. The second column denotes the initial stress on the respective convolutions due to the winding tension, and the third column designates stress when internal pressure is applied in the tank if the convolutions were wound with zero tension. The final column denotes the total stress. Column two is obtained by dividing the tensions in the last line of the first table by the thickness of the various convolutions. Column three is calculated by applying the above equation, and the figures in the last column are obtained by adding the figures in columns two and three.

In the above tabulation, the total stress is the algebraic sum of the initial stress and the stress due to the internal pressure.

The above calculations for a specific tank are merely illustrative of the variable stresses imparted in the respective layers, and these stresses may be varied therefrom to provide a tank suitable for any given service.

From the foregoing it is apparent that we have provided a method of producing a laminated tank wherein the respective convolutions are maintained under a predetermined initial stress calculated to give maximum strength and to safely withstand the working pressures for which a tank is designed.

What we claim and desire to secure by Letters Patent is:

1. The method of making a laminated vessel capable of withstanding a high predetermined internal pressure including forming a tubular shell, applying a fitting to the shell, testing the tubular shell for leaks, winding a sheet metal ribbon into a plurality of convolutions about the shell one directly upon another with the surfaces of one convolution in frictional contact with those of adjacent convolutions whereby said frictional contact maintains the convolutions from relative movement, forming openings in the respective convolutions at the time of winding to pass the fitting, applying differential tension in the respective convolutions at the time and place of said winding, and welding the convolutions to said shell.

2. The method of making a laminated vessel capable of withstanding a high predetermined internal pressure including forming a tubular shell, applying a fitting to the shell, testing the tubular shell for leaks, winding a sheet metal ribbon into a plurality of convolutions about the shell one directly upon another with the surfaces of one convolution in frictional contact with those of adjacent convolutions whereby said frictional contact maintains the convolutions from relative movement, forming openings in the respective convolutions at the time of winding to pass the fitting, applying tension in the respective convolutions at the time and place of said winding, and welding the convolutions to said shell.

GWYNNE RAYMOND.
MERL D. CREECH.
RALPH L. FEAGLES.